March 20, 1934.  W. BRADLEY ET AL  1,951,342
GASEOUS REDUCTION OF METAL OXIDES
Filed Nov. 18, 1929
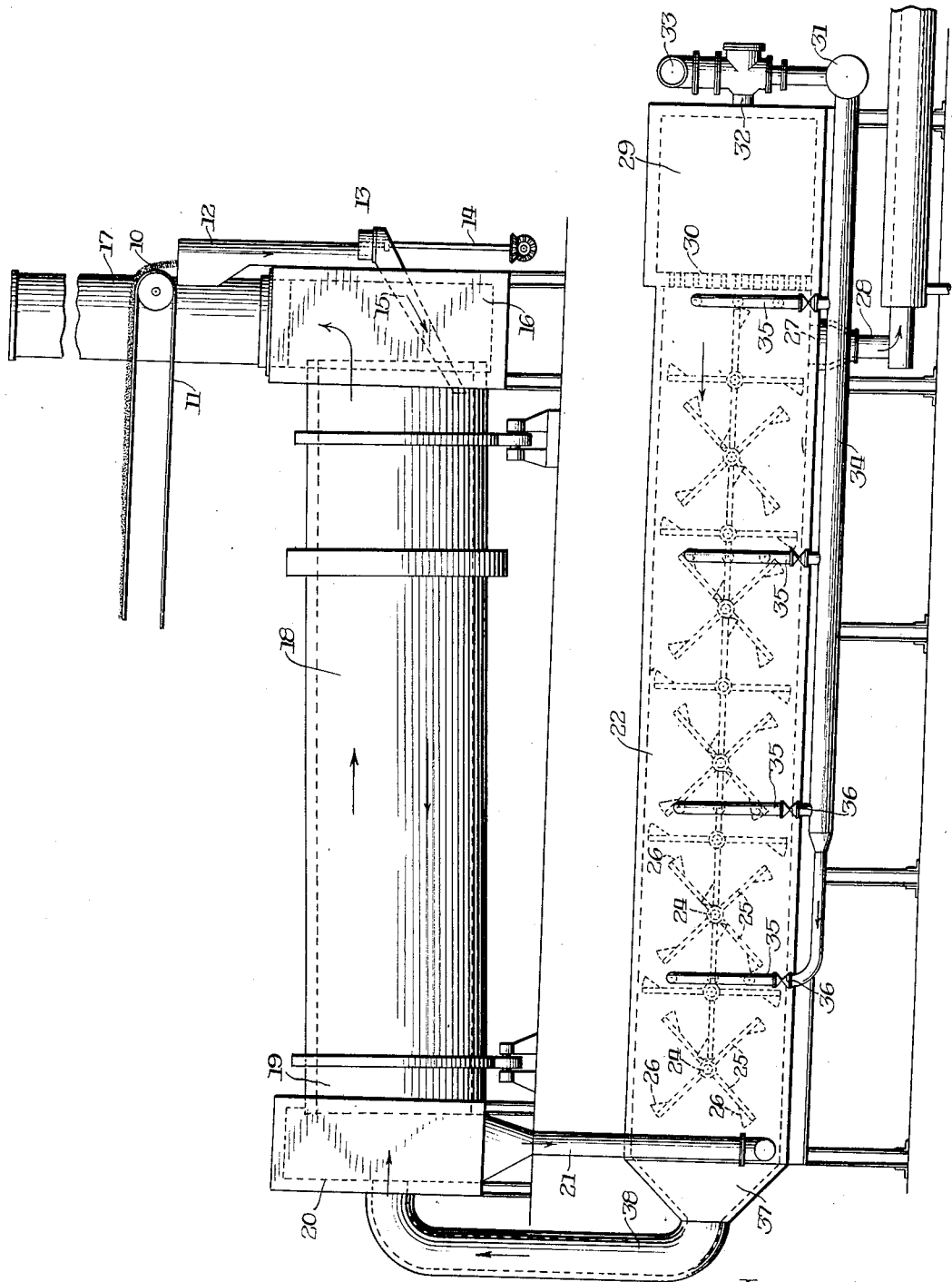
Inventors:
Wilson Bradley
Arthur J. Boynton.
By Brown, Jackson, Boettcher & Diemer
Attys Patented Mar. 20, 1934

1,951,342

UNITED STATES PATENT OFFICE 1,951,342

GASEOUS REDUCTION OF METAL OXIDES

Wilson Bradley, Deerwood, Minn., and Arthur J. Boynton, Chicago, Ill., assignors to Bradley-Fitch Company, Duluth, Minn., a corporation of Minnesota Application November 18, 1929, Serial No. 407,927

10 Claims. (Cl. 23—145)

The present invention relates to the reduction of ore-like materials, such as mixtures of iron oxide and manganese oxides, as in manganiferous iron ores, and has special reference to the use of blast furnace top gas as a reducing agent.

Ordinarily, blast furnace top gas is wasted because it has little utility chemically. It contains a limited amount of carbon monoxide, a useful reducing agent, but because of dilution with other reducing gases and its low reducing power, it has not found any extensive use as a reducing agent. In the processes of treating low grade manganese ores, such as manganiferous ores found in Minnesota, it has been found that carbon monoxide, or illuminating gas, or other reducing gases may be successfully employed to form manganous oxide which can be leached from other material by a salt solution. In a copending application Serial No. 276,221 filed May 9, 1928 by Wilson Bradley, there is described a process for effecting a reduction, at the same time reducing the sesqui-oxide of iron ($Fe_2O_3$), to the magnetic oxide ($Fe_3O_4$) for such an extraction process.

In experiments with the dual or selective reduction described in said application we have discovered that large amounts of combustion products and other diluting gases in the reducing gas do not interfere with the reduction to form manganese oxide and to form the magnetic oxide of iron from a mineral of the character referred to which analyzes:

| | Per cent |
|---|---|
| Manganese | 13.5 |
| Iron | 24.75 |
| Silica | 23.00 |
| Alumina | 1.35 |
| Water (combined) | 8.00 |
| Lime | 8.00 |
| Moisture | 10.00 |

Because of the close relation between the reduced products of such an ore, and the steel industry, we have found it possible, beneficial, and highly economical, to employ as a reducing gas for ore, the blast furnace top gas. By this means we utilize gas which is ordinarily wasted, and by such utilization we increase the over-all efficiency of blast furnace operations, as well as lower the costs for reducing the ore to the desirable reduced forms above mentioned.

One object of the invention is to use blast furnace top gas as a chemical reducing agent.

Another object of the invention is to reduce manganiferous oxides to magnetic iron oxide and manganous oxide.

Still another object of the invention is the drying and reduction of the material in counter current flow toward the reducing gas in order to utilize the heat in the spent reducing gases and the reducing power thereof, to a high degree of efficiency.

In the accompanying drawing there is shown an illustrative apparatus for carrying out the invention, comprising a drying unit connected in combination with a reducing unit. The particular reducing unit herein employed is more particularly described in a copending application of Boynton and Kinney Serial No. 400,257, filed October 17, 1929, which matured to Patent No. 1,906,735, dated May 2, 1933.

In general, the apparatus includes a conveyer which feeds ore or other material to be reduced, into a dryer, preferably a continuous or rotary type permitting continuous flow therethrough, a reducing chamber, preferably one permitting continuous flow therethrough, a gas feed at the ore discharge end of the reducer, a gas conduit from the reducer to the drier, and a stack or outflow for gas at the conveyer end of the drier.

In the drawing ore 10 is indicated as an illustrative material, being fed by conveyer belt 11 into a hopper 12 from which it is admitted by a mechanically operated feeding means 13, having rotary shaft 14, into a chute 15. The chute 15 traverses a stack chamber or box 16 upon which a stack 17 is mounted, and the chute empties into the interior surface of a rotary kiln 18 mounted at one end in the stack box. The kiln is inclined, and in rotation carries the ore to the lower end 19 which is mounted in a box 20 which is effective to discharge the material by gravity into a hopper and chute 21.

The reducing unit comprises an elongated chamber 22 into which ore is fed from chute 21 onto the floor of the reducer. A plurality of conveying means, such as the rotors 24, having arms 25 and buckets 26 pick up and spill the ore to advance it along the reducing unit and to cause efficient contact with the gas. At the other end there is an opening 27 in the floor and a conduit 28 through which the reduced ore is discharged from the unit. The ore-discharge end of the reducer is provided with a combustion chamber 29 having a perforated fire wall 30 between it and the reducer. Fuel gas, such as the blast-furnace top gas is fed into the combustion chamber from a supply 31 by means of a burner 32. Air may be provided by a supply line 33.

A conduit 34 from the gas supply conducts gas to various risers 35 spaced along the length of the reducer from which gas is admitted into the reducing chamber at a plurality of levels. Valves 36 are provided in the risers. The ore-feed end of the reducer is capped with gas collecting hood 37 terminating in a conduit 38 which enters the box 20 at the end of the drying kiln.

It is of course to be understood that the apparatus may be varied and modified to effect the process herein described, but the combination is typical of what is economically suitable for the process.

The blast furnace top gas herein employed in general contains from 10% to 16% carbon dioxide and from 24% to 30% carbon monoxide. The carbon monoxide imparts to the gas a limited reducing power which we have found is particularly available for the reductions herein desired. A typical example of blast furnace gas is given:

| | Percent |
|---|---|
| Carbon monoxide | 25.12 |
| Carbon dioxide | 12.56 |
| Hydrogen | 3.29 |
| Nitrogen | 55.65 |
| Water vapor | 3.38 |
| | 100.00 |

In our operations as we have herein described them for the purpose of illustrating the invention, a part of the gas is burned by admitting air to provide heat for the reaction and for controlling the temperature of the reaction chamber. A major preliminary combustion of gas occurs in a combustion chamber, the hot products analyzing:

| | Percent |
|---|---|
| Carbon dioxide | 29.50 |
| Nitrogen | 67.27 |
| Oxygen | .06 |
| Water vapor | 3.17 |

These heated products pass through the reduction chamber into which additional quantities of blast furnace gas are admitted to carry on the reduction. The mixed gases, at a temperature of about 1460° F. (793° C.), may have an approximate composition for the reducing operation as follows:

| | Percent |
|---|---|
| Carbon dioxide | 15.99 |
| Carbon monoxide | 20.03 |
| Hydrogen | 2.62 |
| Oxygen | .01 |
| Nitrogen | 58.01 |
| Water vapor | 3.43 |
| | 100.09 |

The hot spent reducing gas used in the drying operations on the material that enters the reducing unit is discharged as a waste gas at a temperature of about 1020° F. (549° C.) and may analyze as follows:

| | Percent |
|---|---|
| Carbon dioxide | 25.48 |
| Nitrogen | 54.42 |
| Water vapor | 20.10 |

The original ore may be dried and partly reduced in the drying kiln, but the drying is the essential operation involved. Dried ore may analyze:

| | Percent |
|---|---|
| Manganese | 15 |
| Iron | 27.5 |
| Silica | 25.56 |
| Alumina | 1.5 |
| Lime | 1.0 |
| Water (combined) | 8.9 |

The ore after reduction may analyze:

| | | Percent |
|---|---|---|
| Manganous oxide | $MnO$ | 19.53 |
| Manganese dioxide | $MnO_2$ | 1.26 |
| Magnetic iron | $Fe_3O_4$ | 34.74 |
| Ferrous oxide | $FeO$ | 5.23 |
| Silica | $SiO_2$ | 27.14 |
| Alumina | $Al_2O_3$ | 1.58 |
| Lime | $CaO$ | 1.06 |
| Water (combined) | $H_2O$ | 9.45 |
| | | 99.99 |

From the foregoing it will be readily appreciated that the apparatus and the process herein described are effective to attain the desired results, that is, economically to use blast furnace top gas to effect the formation of either manganous oxide or magnetic iron oxide, or both conjointly, as expressed in the appended claims.

We claim:

1. The method of treating manganiferous iron-containing material to form manganous oxide and magnetic oxide of iron which comprises subjecting the material to the incomplete reducing action of blast furnace top gas to which additional air has been added.

2. The method of treating manganiferous iron-containing material to form manganous oxide and magnetic oxide of iron which comprises subjecting the material to the incomplete reducing action of the hot combustion products of blast furnace top gases incompletely burned with addition of air.

3. The method of treating higher oxides of manganese to form manganous oxide which comprises subjecting the material to the reducing action of blast furnace top gas and added air.

4. The method of treating ferric oxide of iron to form the magnetic oxide of iron which comprises subjecting the oxides of iron to incomplete reduction by the action of heated blast furnace top gas and added air.

5. The method of treating manganiferous iron-containing oxides to form manganous oxide and magnetic oxide of iron which comprises subjecting the oxides to the incomplete reducing action of a hot gas containing from 12% to 30% or carbon dioxide and less than 25% of carbon monoxide.

6. The method of treating manganiferous iron-containing oxides to form manganous oxide and magnetic oxide of iron which comprises subjecting the oxides to the reducing action of hot gaseous combustion products containing less than 25% carbon monoxide and less than 30% carbon dioxide.

7. The method of treating higher metallic oxides to form lower metallic oxides which comprises subjecting the higher oxides to the reducing action of hot gaseous combustion products containing less than 25% carbon monoxide and less than 30% carbon dioxide.

8. The method of treating a material containing manganese oxide and iron oxide to form a separable mixture of manganous oxide and magnetic oxide of iron which consists of burning blast furnace top gas with air, admitting the hot products of said combustion and additional blast furnace top gas into a chamber containing said material, and moving the material against the outflow of gases at a rate which prevents complete reduction whereby magnetic iron oxide and manganous oxide are obtained.

9. The method of treating a material containing iron oxide to form a magnetic oxide of iron which comprises burning a blast furnace top gas with air, admitting the hot products of said combustion and additional blast furnace top gas into a chamber containing said material, and moving the material against the outflow of gases at a rate which prevents complete reduction, whereby magnetic iron oxide is obtained.

10. The method of treating material containing manganese oxide to form manganous oxide which consists of burning blast furnace top gas with air, admitting the hot products of said combustion and additional blast furnace top gas into a chamber containing said material, and moving the material against the outflow of gases at a rate which prevents complete reduction, whereby manganous oxide is obtained.

WILSON BRADLEY.
ARTHUR J. BOYNTON.

CERTIFICATE OF CORRECTION.

Patent No. 1,951,342. March 20, 1934.

WILSON BRADLEY, ET AL.

It is hereby certified that error appears in the printed specification of the above numbered patent requiring correction as follows: Page 2, line 101, claim 1, and line 113, claim 3, before "blast" insert heated; and that the said Letters Patent should be read with these corrections therein that the same may conform to the record of the case in the Patent Office.

Signed and sealed this 24th day of April, A. D. 1934.

Bryan M. Battey (Seal) Acting Commissioner of Patents.